United States Patent [19]

Ototake et al.

[11] Patent Number: 4,841,034
[45] Date of Patent: Jun. 20, 1989

[54] WATER-SOLUBLE AZO COMPOUNDS HAVING A TRIAZINE MOIETY AND DYEING METHOD THEREWITH

[75] Inventors: Satoshi Ototake, Ohmiya; Ryozo Matsunaga; Masao Furusawa, both of Tokyo, all of Japan

[73] Assignee: Nippon Kayaku Kabushiki Kaisha, Tokyo, Japan

[21] Appl. No.: 671,036

[22] Filed: Nov. 15, 1984

Related U.S. Application Data

[63] Continuation of Ser. No. 443,674, Nov. 22, 1982, abandoned.

[30] Foreign Application Priority Data

Dec. 3, 1981 [JP] Japan ................... 56-193629

[51] Int. Cl.[4] ............ C09B 45/08; C09B 45/28; C09B 45/01; D06P 1/10
[52] U.S. Cl. ...................... 534/701; 8/674; 8/686; 534/502; 534/583; 534/598; 534/602; 534/663; 534/797; 534/880
[58] Field of Search ............. 534/701, 797, 663, 662; 260/146 T, 153; 8/674, 686

[56] References Cited

U.S. PATENT DOCUMENTS 2,835,663  5/1958  Benz .................... 260/146 T
4,337,195  6/1982  Vater et al. ............. 260/146 T

FOREIGN PATENT DOCUMENTS 2122634  1/1984  United Kingdom ........... 260/146 T

OTHER PUBLICATIONS

Hosoda, "Shin–Senryo Kagaka", (New Dyestuff Chemistry) published by Gihodo, Nov. 5, 1963.

Primary Examiner—Floyd D. Higel
Attorney, Agent, or Firm—Henry C. Nields

[57] ABSTRACT

Water-soluble metallized disazo compounds which, in the free acid form, are represented by the following formula:

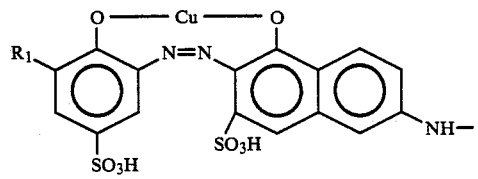

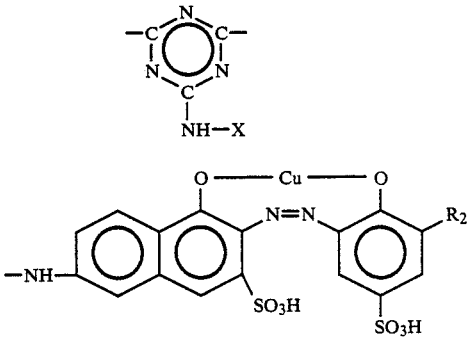

wherein $R_1$ and $R_2$ stand independently for chlorine or nitro, and X stands for phenyl which may be substituted with chlorine, methyl, lower alkoxy, hydroxyl or carboxyl, for use in dyeing.

6 Claims, No Drawings

WATER-SOLUBLE AZO COMPOUNDS HAVING A TRIAZINE MOIETY AND DYEING METHOD THEREWITH

This application is a continuation of application Ser. No. 443,674, filed Nov. 22, 1982, now abandoned.

DETAILED DESCRIPTION OF THE INVENTION

The present invention relates to water-soluble azo compounds which, in the free acid form, are represented by the formula:

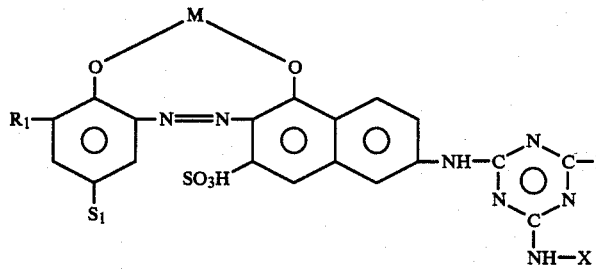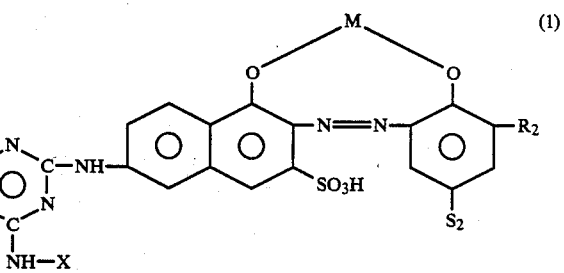

(1)

wherein $S_1$ stands for chlorine or sulfo, $S_2$ stands for chlorine, sulfo or sulfonamido, $R_1$ stands for chlorine, sulfo or nitro, $R_2$ stands for hydrogen, chlorine, sulfo or nitro, with the proviso that at least one of $R_1$, $R_2$, $S_1$ and $S_2$ stands for sulfo, M stands for divalent copper or divalent nickel, and X stands for phenyl which may be substituted with chlorine, methyl, lower alkoxyl, hydroxyl or carboxyl, and a dyeing method using said compounds.

In dyeing cotton red with good fastness to light and washing, direct dyestuffs have been used for realizing very faint red color and reactive dyestuffs have been used for realizing light and heavy shade red color particularly from the viewpoint of fastness to wetness. On the other hand, some of the direct dyestuffs having a good fastness to washing such as C.I. Direct Red 83 have been used for realizing not only the very faint red color but also medium or heavy red color. However, as compared with an ordinary dip dyeing method wherein cellulose fibers are dyed with a direct dyestuff, affinity of C.I. Direct Red 83 to fibers deteriorates seriously owing to its structure when it is used together with a disperse dyestuff for dyeing polyester/cotton blended fibers by a one-bath dyeing method using an acidic bath at a high temperature.

The development of a red direct dyestuff which has good suitability for one-bath high temperature dyeing in acid bath and good fastness to washing, etc. has eagerly been sought in order to reduce dyeing time and to save labor and energy, since dyeing costs have increased owing to the rise in the cost of labor and the price of petroleum.

An object of the present invention is to provide new red, water-soluble azo compounds which have high fastness to washing, etc., which satisfy the above-mentioned conditions and which are capable of dyeing polyester/cotton blended fibers under the same dyeing conditions as disperse dyes (high temperature, acid bath).

The new, water-soluble azo compounds according to the present invention can be produced by, for example, the following methods: (A) or (B)

(A) A compound of the formula:

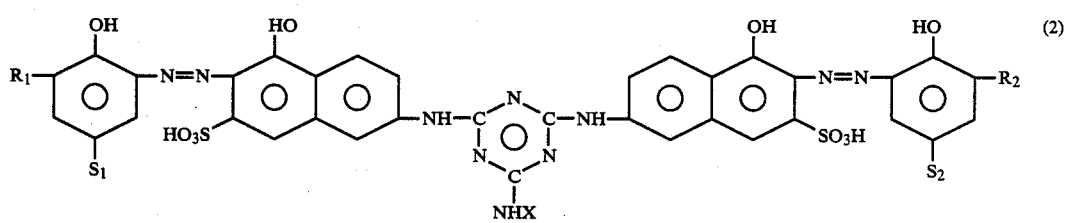

(2)

wherein $S_1$, $S_2$, $R_1$, $R_2$ and X have the same meanings as above, is converted into a metal complex salt with a copper reagent or nickel reagent.

(B) A compound of the formula:

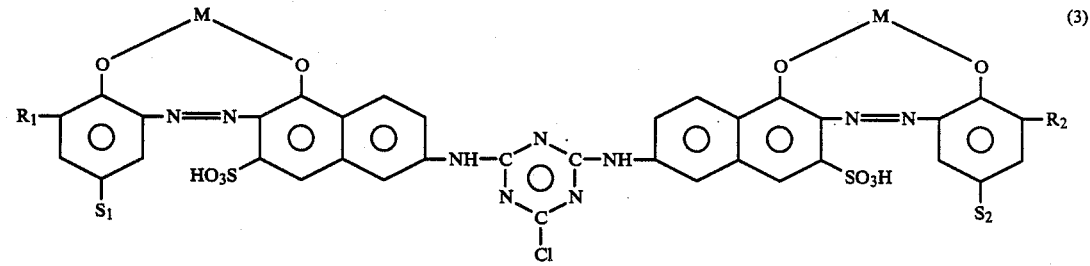

(3)

is condensed with a compound of the formula:

$$H_2N-X \qquad (4)$$

wherein X has the same meaning as above.

In method (A) the reaction is carried out preferably at a temperature of 0° to 98° C. and as the copper reagent copper sulfate, copper acetate and ammonium complex salt of copper are used and as the nickel reagent nickel sulfate, nickel chloride and nickel acetate ammonium complex salt of nickel are used. When amines such as ammonia water and ethanolamine are added, the reaction is accelerated.

A compound of the formula (2) is made as follows:

(1) 1 mol of cyanuric chloride is subjected to a primary condensation reaction with 1 mol of an aminoazo compound of the following formula (5) or (6) at a temperature of, for example, below 10° C., preferably 0° to 5° C.:

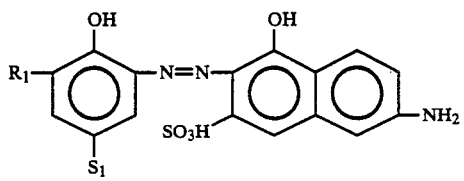

wherein $S_1$ and $R_1$ have the same meanings as above

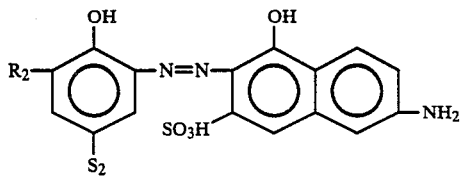

wherein $S_2$ and $R_2$ have the same meanings as above then, the reaction product is subjected to a secondary condensation reaction with 1 mol of an aminoazo compound of formula (6) or (5) at 30° to 70° C., preferably 50° to 60° C., then, the resulting reaction product is further subjected to a tertiary condensation reaction with 1 mol of an amino compound of formula (4) at preferably 90° to 98° C.

(2) 2 mols of a compound of formula

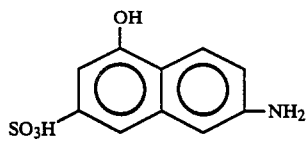

are added to the dispersed solution of 1 mol of cyanuric chloride below about 10° C. and the mixture is stirred preferably at 50° C. and pH of 3.5 to 4.5.

(The above reaction corresponds to the primary and secondary condensation reations.)

The reaction product is coupled in an arbitrary order with 1 mol (2 mols in total) of each diazonium compound of a compound of the formula 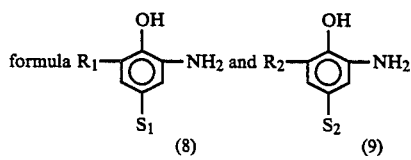

wherein $R_1$ is hydrogen or methyl, $R_1$, $R_2$, $S_1$ and $S_2$ have the same meanings as above, preferably at a temperature of 10 ° to 15° C. and pH of 9 to 10.5.

The product thus obtained is subjected to the tertiary condensation reaction with 1 mol of the compound of formula (4) preferably at a temperature of 90° to 95° C. and pH of 4 to 6.5.

(3) 1 mol of cyanuric chloride is subjected to a primary condensation reaction with 1 mol of a compound of formula (7) preferably at a temperature of below 10° C. Then the reaction is subjected to a coupling reaction with 1 mol of a diazonium compound derived from the compound of formula (8) or (9) preferably at a temperature of 10° to 11° C.

Then the reaction product is subjected to a secondary condensation reaction with 1 mol of a compound of formula (7) preferably at a temperature of about 50° C. and pH of 3.5 and 4.5.

Then, the product thus obtained is coupled with 1 mol of a diazonium compound obtained by diazotizing the compound of formula (8) or (9) (which is not used in the above coupling reaction)

In method (B) the reaction is carried out at preferably 90° to 98° C. at pH 4 to 6.5 in a conventional manner.

A compound of the formula (3) is made as follows.

(1) 1 mol of cyanuric chloride is subjected to a primary condensation reaction with 1 mol of an aminoazo compound of the above formula (5) or (6) at a temperature of, for example, below 10° C., preferably 0° to 5° C.; then, the reaction product is subjected to a secondary condensation reaction with 1 mol of an aminoazo compound of formula (6) or (5) at 30° to 70° C., preferably 50° to 60° C.; then, the resulting reaction product is converted into a metal complex salt thereof with a copper reagent or a nickel reagent.

(2) 2 mols of a compound of formula

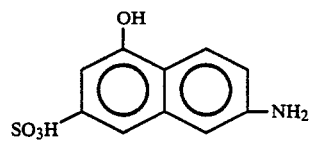

are added to the dispersed solution of 1 mol of cyanuric chloride below about 10° C. and the mixture is stirred preferably at 50° C. and pH of 3.5 and 4.5.

(The above reaction corresponds to the primary and secondary condensation reactions.)

Then the resulting reaction product is coupled with 1 mols (2 mol in total) of each diazonium compound of a compound of the formula (8) and (9) and then the product thus obtained is converted into a metal complex salt thereof with a copper reagent or nickel reagent.

As examples of the aminoazo compounds of formula (5), the following compounds may be mentioned:

1-hydroxy-2-(2-hydroxy-3-chloro-5-sulfophenylazo)-3-sulfo-6-aminonaphthalene, 1-hydroxy-2-(2-hydroxy-3-sulfo-5-chlorophenylazo)-3-sulfo-6-aminonaphthalene, and 1-hydroxy-2-(2-hydroxy-3-nitro-5-sulfophenylazo)-3-sulfo-6-aminonaphthalene.

As examples of the aminoazo compounds of formula (6),the following compounds may be mentioned:

1-hydroxy-2-(2-hydroxy-3-chloro-5-sulfophenylazo)-3-sulfo-6-aminonaphthalene, 1-hydroxy-2-(2-hydroxy-5-chlorophenylazo)-3-sulfo-6-aminonaphthalene, 1-hydroxy-2-(2-hydroxy-5-sulfonamidophenylazo)-3-sulfo-6-aminonaththalene, 1-hydroxy-2-(2-hydroxy-3-sulfo-5-chlorophenylazo)-3-sulfo-6-aminonaphthalene,
1-hydroxy-2-(2-hydroxy-5-sulfophenylazo)-3-sulfo-6aminonaphthalene, and 1-hydroxy-2-(2-hydroxy-3-nitro-5sulfophenylazo)-3-sulfo-6-aminonaphthalene.

As examples of the amino compounds of formula (4), the following compounds may be mentioned: aniline, o-chloroaniline, m-chloroaniline, p-chloroaniline, 2,4-dichloroaniline, 2,5-dichloroaniline, m-toluidine, p-toluidine, 2,4-dimethylaniline, 2,4-dimethoxyaniline, p-anisidine, 2-methoxy-5-methylaniline, 2-methyl-4-chloroaniline, p-carboxyaniline, m-carboxyaniline and 4-hydroxy-3-carboxyaniline.

Preferred compounds of formula (1) according to the present invention are those which, in the free acid form, are represented by the following formula:

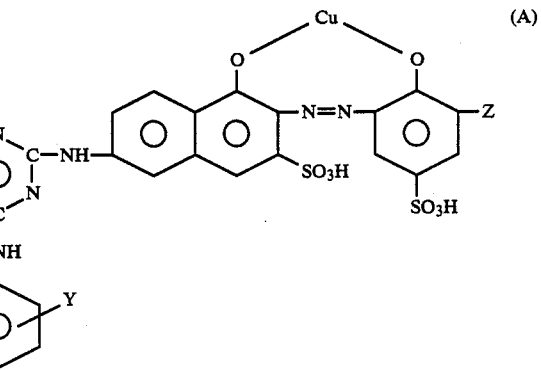

wherein Y stands for hydrogen or methyl and Z stands for hydrogen or chlorine.

Particularly preferred compounds are those of the above formula (A) wherein Y stands for hydrogen and Z stands for chlorine.

The novel water-soluble azo compounds of the present invention are capable of dyeing natural or artificial cellulose fibers in bluish red with a very high color value, excellent washing fastness and light fastness by ordinary dyeing methods for dyeing cellulose fibers with direct dyestuffs such as dip dyeing, continuous dyeing or printing with a color paste, ordinary dyeing methods for dyeing polyester fibers with a disperse dyestuff such as high-temperature dyeing, carrier dyeing, thermosol dyeing or printing, and dyeing methods carried out under conditions ordinarily adopted for dyeing acrylic fibers with cationic dyestuffs such as dip dyeing or printing method.

The dyestuffs of the present invention have a great characteristic feature that they are capable of dyeing cellulose portions of polyester/cotton blended fibers together with a disperse dyestuff under dyeing conditions of the disperse dyestuff (particularly, a high-temperature one-bath one-step dyeing method) to provide dyed fibers having excellent fastness to washing, etc.

The dyestuffs of the present invention can be used together with other water soluble dyestuffs.

The following examples will further illustrate the present invention, which by no means limit the invention. In the examples, parts are given by weight and the water soluble group-containing starting materials and intended products are shown in the form of free acids.

EXAMPLE 1

3.7 parts of cyanuric chloride were added to 50 parts of ice-water and 0.1 part of Liponox NA (a nonionic surfactant of Lion Yushi Co., Ltd.) and the mixture was stirred vigorously to obtain a homogeneous dispersion. A solution prepared by dissolving 9.48 parts of an aminoazo compound of the formula:

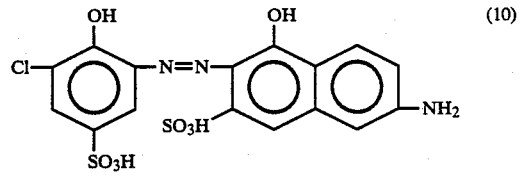

(obtained by diazotizing 3-amino-4-hydroxy-5-chlorobenzenesulfonic acid by an ordinary method and then coupling the product with 1-hydroxy-3-sulfo-6-aminonaphthalene) in 150 parts of warm water under a neutral condition was added dropwise thereto over 30 min at a reaction temperature maintained at 0° to 5° C. The reaction was carried out at this temperature for 3 h. After confirming that an unreacted aminoazo compound of formula (10) was no more detected, a solution of 9.48 parts of the aminoazo compound of formula (10) prepared in the same manner as above was further added thereto and the temperature was elevated to 60° C. At the same time, a 10% aqueous sodium carbonate solution was added dropwise thereto to adjust the pH of the reaction mixture to 4 to 6. The reaction was carried out at a temperature maintained at 60° C. When the unreacted aminoazo compound of formula (10) became hardly detected, a solution of 10 parts of copper sulfate in 50 parts of warm water was added thereto. The temperature was maintained at 50° to 60° C. Immediately thereafter, a 10% aqueous sodium carbonate solution was added thereto to adjust the pH of the reaction liquid to 5 to 6 and the reaction was carried out for 1 h. 3.06 parts of 5-aminosalicylic acid was dissolved in 50 parts of warm water under a weak alkaline condition. The resulting solution was added to the reaction mixture and the temperature was adjusted to 93° to 98° C. Simultaneously, a 10% aqueous sodium carbonate solution was added dropwise thereto to adjust the pH of the reaction mixture to 8.0 to 8.5 and the reaction was carried out at a temperature maintained at 93° to 98° C. Then, sodium chloride was added to the reaction mixture to precipitate the product. After the filtration followed by drying, a dyestuff of the following formula (as free acid):

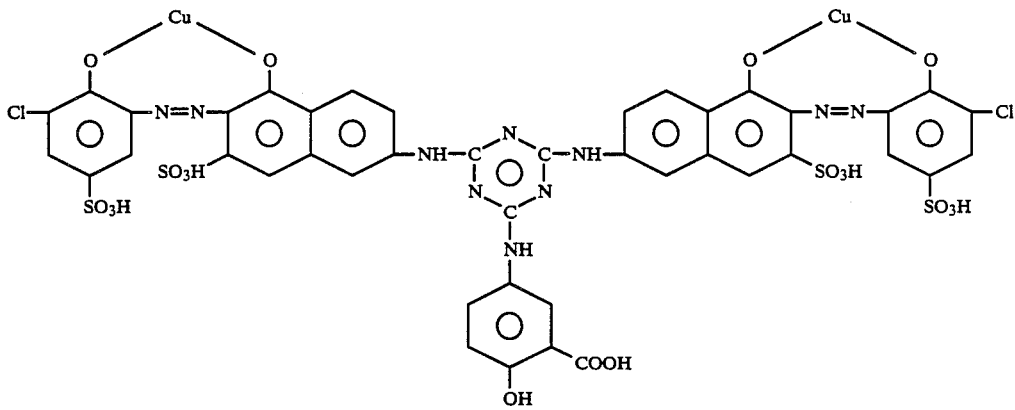

was obtained. An aqueous solution of this dyestuff was red. It had maximum absorption at 550 μ (in a 20% aqueous pyridine solution). The dyestuff dyed cotton fibers bluish red.

EXAMPLE 2

3.7 parts of cyanuric chloride was condensed with 9.48 parts of an aminoazo compound of the above formula (10). Then, the product was condensed with 8.78 parts of anaminoazo compound, i.e. 1-hydroxy-2-(2-hydroxy-3-sulfo-6-aminonaphthalene obtained by diazotizing 3-amino-4-hydroxybenzenesulfonic acid by an ordinary method and coupling the resulting product with 1-hydroxy-3-sulfo-6-aminonaphthalene. When the unreacted aminoazo compound became hardly detected, 2.79 parts of aniline was added to the reaction mixture and the reaction was carried out at 90° to 95° C. for 5 h. A solution of 10 parts of copper sulfate in 50 parts of warm water was added to the mixture and the resulting solution was maintained at 90° to 95° C. Immediately thereafter, a 10% aqueous sodium carbonate solution was added thereto to adjust the pH of the reaction mixture to 5 to 6 and the reaction was carried out for 1 h. Sodium chloride was added to the reaction mixture to precipitate the product. After the filtration followed by drying, a dyestuff of the following formula (as free acid):

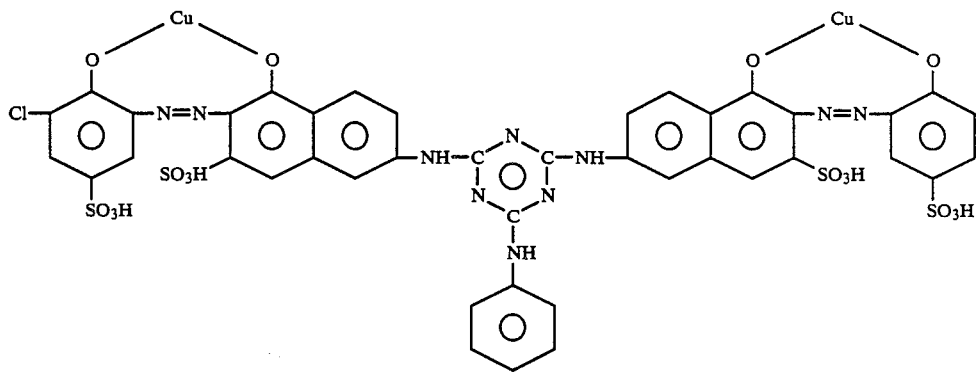

was obtained. An aqueous solution of this dyestuff was bluish red. It had maximum absorption at 545 μ (in a 20% aqueous pyridine solution). The dyestuff dyed cotton fibers bluish red.

EXAMPLES 3 to 23

The compounds shown in the following table were obtained in the same manner as in Example 1 or 2.

| Example | Dyestuff | Maximum absorption | Hue as applied to cotton |
|---|---|---|---|
| 3 | (structure with phenyl group on triazine) | 551 mμ | Bluish red |
| 4 | (structure with 4-methylphenyl group on triazine) | 547 mμ | Bluish red |
| 5 | (structure with 3-methylphenyl group on triazine) | 543 mμ | Bluish red |

-continued

| Example | Dyestuff | Maximum absorption | Hue as applied to cotton |
|---|---|---|---|
| 6 | [structure with two copper-complexed azo groups linked through triazine with NH-(2-methylphenyl)] | 545 mμ | Bluish red |
| 7 | [structure with two copper-complexed azo groups linked through triazine with NH-(2,4-dimethylphenyl)] | 548 mμ | Bluish red |

-continued

| Example | Dyestuff | Maximum absorption | Hue as applied to cotton |
|---|---|---|---|
| 8 | (structure shown) | 544 mμ | Bluish red |
| 9 | (structure shown) | 538 mμ | Bluish red |
| 10 | (structure shown) | 535 mμ | Bluish red |

-continued

| Example | Dyestuff | Maximum absorption | Hue as applied to cotton |
|---|---|---|---|
| 11 | (structure with central triazine bearing NH–(4-chlorophenyl), flanked by two copper-complexed azo naphthalene–phenyl (Cl, SO₃H) systems) | 548 mµ | Bluish red |
| 12 | (structure with central triazine bearing NH–(2,4-dichlorophenyl), flanked by two copper-complexed azo naphthalene–phenyl (Cl, SO₃H) systems) | 551 mµ | Bluish red |
| 13 | (structure with central triazine bearing NH–(2,5-dichlorophenyl), flanked by two copper-complexed azo naphthalene–phenyl (Cl, SO₃H) systems) | 535 mµ | Bluish red |

-continued

| Example | Dyestuff | Maximum absorption | Hue as applied to cotton |
|---------|----------|--------------------|--------------------------|
| 14 | Cu-complex azo dye with trichlorotriazine linker bearing 2,4-dimethoxyanilino group | 540 mμ | Bluish red |
| 15 | Cu-complex azo dye with trichlorotriazine linker bearing 2,5-dimethoxyanilino group | 537 mμ | Bluish red |
| 16 | Ni-complex azo dye with trichlorotriazine linker bearing anilino group | 552 mμ | Bluish red |

-continued

| Example | Dyestuff | Maximum absorption | Hue as applied to cotton |
|---|---|---|---|
| 17 | (structure) | 548 mμ | Bluish red |
| 18 | (structure) | 546 mμ | Bluish red |
| 19 | (structure) | 560 mμ | Reddish purple |

-continued

| Example | Dyestuff | Maximum absorption | Hue as applied to cotton |
|---|---|---|---|
| 20 | (structure with Cu complex, bis-azo, triazine with NH-phenyl, nitro and SO₃H substituents) | 562 mμ | Reddish purple |
| 21 | (structure with Cu complex, bis-azo, triazine with NH-(hydroxyphenyl), Cl and SO₃H substituents) | 547 mμ | Bluish red |
| 22 | (structure with Cu complex, bis-azo, triazine with NH-(hydroxyphenyl), Cl and SO₃H substituents) | 549 mμ | Bluish red |

-continued
| Example | Dyestuff | Maximum absorption | Hue as applied to cotton |
|---|---|---|---|
| 23 | 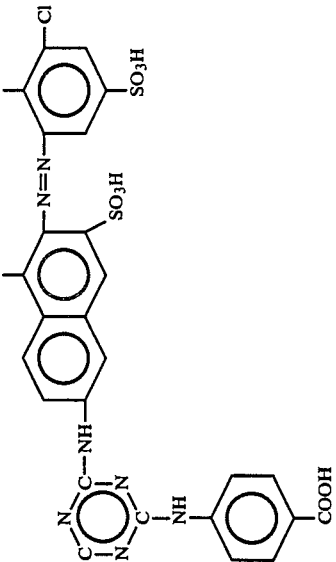 | 545 mμ | Bluish red |

EXAMPLE 24

High-temperature, one-bath dyeing of polyester/cotton blended fibers:

A dyeing bath of pH 4.5 was prepared from 0.2 parts of the dyestuff prepared in Example 1, 4 parts of anhydrous sodium sulfate, 0.2 parts of Kayalon Polyester Rubine BL-S (a disperse dye of Nippon Kayaku Co., Ltd.), 0.64 parts of sodium acetate trihydrate, 0.42 parts of acetic acid and 400 parts of water. The dyeing bath was heated to 50° C. and 20 parts of polyester/ cotton (50/50) blended fibers were placed therein. The temperature was elevated to 130° C. in 30 min and the dyeing was effected at that temperature for 45 min. Then, the temperature was lowered to 90° C. in 15 min and the dyeing was continued for a further 15 min.

The dyed fibers were taken out, washed with water, subjected to the ordinary fixing treatment using a commercially available copper-containing polyamine fixing agent and then to a soaping treatment, washed with water and finally dried. The dyed polyester/ cotton blended fibers had level bluish red color of excellent fastness to washing, light and chlorine.

EXAMPLE 25

High-temperature, one-bath dyeing of polyester/cotton blended fibers:

The dyeing was carried out in the same manner as in Example 24 except that 0.2 parts of the dyestuff prepared in Example 2 was used in place of the dyestuff prepared in Example 1. The dyed fibers were taken out, washed with water, subjected to fixing treatment with a commercially available polyamine fixing agent and then to a soaping treatment, washed with water and finally dried. The dyed polyester/cotton blended fibers had level bluish red color of excellent fastness to washing, light and chlorine.

EXAMPLE 26

Dyeing of cotton fibers:

A dyeing bath was prepared from 0.4 parts of the dyestuff prepared in Example 1, 4 parts of anhydrous sodium sulfate and 400 parts of water. The dyeing bath was heated to 40° C. and 20 parts of a knitted cotton fabric was placed therein. The temperature was elevated to 90° C. in 20 min and the dyeing was effected at this temperature for 30 min. The dyed product was taken out and washed with water. The dyed product was subjected to the ordinary fixing treatment with a commercially available copper-containing polyamine fixing agent. washed with water and dried. The dyed knitted cotton fabric had level bluish red color of excellent fastness to washing, light and chlorine.

EXAMPLE 27

9.56 parts of J-acid were dissolved into 20 parts of water at pH of 6 to 6.5. The solution was added to a mixture of 50 parts of ice-water, 3.7 parts of cyanuric chloride and 0.1 part of Liponox NA below 10° C. After the reaction mixture was stirred for about 1.5 hrs, the pH value of the reaction mixture was found to be 1 to 1.5. The reaction mixture was further stirred about 2 hrs, at a temperature of 50° C. and pH of 3.5 to 4.5.

Then diazonium solution obtained by diazotizing 9.2 parts of 3-chloro-4-hydroxy-5-aminobenzenesulfonic acid was added to the above reaction mixture at a temperature of 10° to 15° C. and pH of 10 to 10.5.

Then, 7.6 parts of aniline was added to the reaction mixture and the whole was stirred at a temperature of 90° to 95° C. for 4 hrs and pH of 5-6.

A solution of 10 parts of copper sulfate in 50 parts of warm water was added to the mixture and the resulting solution was maintained at 90° to 95° C. and pH of 6.0 to 6.5.

Sodium chloride was added to the reaction mixture to precipitate the product. After the filtration followed by drying, a dyestuff having the formula of Example 3 was obtained.

After reacting cyanuric chloride with J-acid as in the above Example, the following reactions were conducted by changing the reaction sequence of the condensation reaction with aniline and the conversion into a copper complex and the same dyestuff having the formula of Example 3 was obtained.

EXAMPLE 28

4.8 parts of J-acid were dissolved into 20 parts of water at pH of 6 to 6.5. The solution was added to a mixture of 50 parts of ice water, 3.7 parts of cyanuric chloride and 0.1 part of Lipponox NA below 10° C. and pH of 10 for 1 hr. Then, a diazonium solution obtained by diazotizing 3.9 parts of 3-amino-4-hydroxybenzene sulfonic acid was added to the reaction mixture at 10° to 15° C. and pH of 7-8. Then, another solution containing 4.8 parts of J-acid were added to the reaction mixture and the reaction mixture was stirred at 50° C. and pH of 3.5 to 4.5 for 2 hours. After that, the temperature of the reaction mixture was lowered to 10° to 15° C. Then, the diazonium solution obtained by diazotizing 3.9 parts of 4.6 parts of 3-chloro-4-hydroxy-5-aminobenzene sulfonic acid was added to the above reaction mixture of pH of 10 to 10.5. After the reaction the pH value of the mixture was adjusted to 5.0 to 5.5 and 7.6 parts of aniline was added to the mixture and the whole was stirred at 90° to 95° C. for 5 hrs. Then the reaction mixture was subjected to converting reaction using copper sulfate by the manner similar to that of Example 27. Sodium chloride was added to the reaction mixture the precipitate the product. After the filtration followed by drying, the dyestuff having the formula of Example 2 was obtained.

What is claimed is:

1. A water-soluble azo compound which, in the free acid form, is represented by the following formula:

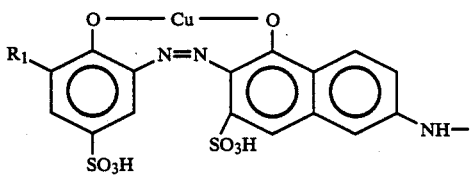

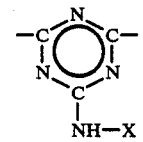

-continued

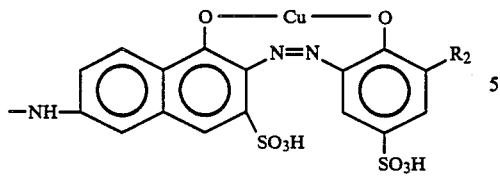

wherein $R_1$ and $R_2$ stand independently for chlorine or nitro, and X stands for phenyl which may be substituted with chlorine, methyl, lower-alkoxy or carboxyl.

2. A water-soluble azo compound according to claim 1 which, in the free acid form, is represented by the following formula:

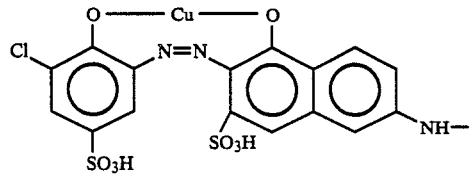

-continued wherein Y stands for hydrogen or methyl.

3. A water-soluble azo compound according to claim 2 wherein Y stands for hydrogen.

4. A water-soluble azo compound according to claim 1 which, in the free acid form, is represented by the following formula:

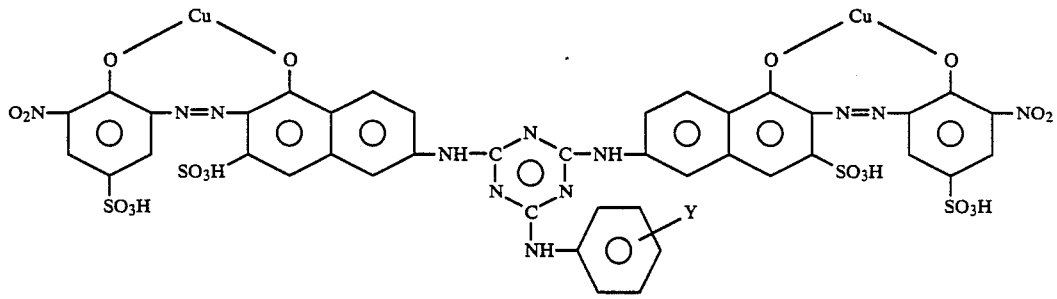

wherein Y stands for hydrogen or methyl.

5. A water-soluble azo compound according to claim 4 wherein Y stands for hydrogen.

6. A method for dyeing cellulose fibers which comprises dyeing said fibers with the water-soluble azo compound of claim 1.

* * * * *